United States Patent
Warburg et al.

(10) Patent No.: US 11,950,728 B2
(45) Date of Patent: Apr. 9, 2024

(54) FLUME, AND METHOD, FOR SUPPLYING VEGETABLE PIECES

(71) Applicant: Frito-Lay Trading Company GmbH, Bern (CH)

(72) Inventors: Barbara Warburg, Leicestershire (GB); Simon Lawton, Leicestershire (GB)

(73) Assignee: Frito-Lay Trading Company GmbH, Bern (CH)

( * ) Notice: Subject to any disclaimer, the term of this patent is extended or adjusted under 35 U.S.C. 154(b) by 393 days.

(21) Appl. No.: 17/416,827

(22) PCT Filed: Jan. 21, 2020

(86) PCT No.: PCT/EP2020/051403
§ 371 (c)(1),
(2) Date: Jun. 21, 2021

(87) PCT Pub. No.: WO2020/152159
PCT Pub. Date: Jul. 30, 2020

(65) Prior Publication Data
US 2022/0079384 A1    Mar. 17, 2022

(30) Foreign Application Priority Data

Jan. 25, 2019    (GB) ..................... 1901058

(51) Int. Cl.
*A47J 37/12*    (2006.01)
*A23L 5/10*    (2016.01)
(Continued)

(52) U.S. Cl.
CPC ............ *A47J 37/1271* (2013.01); *A23L 5/10* (2016.08); *A23L 19/18* (2016.08); *B65G 11/026* (2013.01);
(Continued)

(58) Field of Classification Search
None
See application file for complete search history.

(56) References Cited

U.S. PATENT DOCUMENTS

| | | | | | |
|---|---|---|---|---|---|
| 1,947,011 | A | * | 2/1934 | Karthauser | .......... B65G 11/026 |
| | | | | | 193/2 R |
| 4,027,760 | A | * | 6/1977 | Somerville | ........... E01C 19/182 |
| | | | | | 198/525 |

(Continued)

FOREIGN PATENT DOCUMENTS

| | | | | |
|---|---|---|---|---|
| GB | 2481468 | | 12/2011 | |
| GB | 2519792 | B * | 2/2017 | ............. A23L 19/18 |

(Continued)

OTHER PUBLICATIONS

International Search Report dated Apr. 15, 2020 in Application No. PCT/EP2020/051403.

(Continued)

*Primary Examiner* — Joseph A Dillon, Jr.
(74) *Attorney, Agent, or Firm* — Barnes & Thornburg LLP; G. Peter Nichols (57) ABSTRACT

A flume for supplying vegetable pieces in a supply of liquid, the flume extending between a flume inlet and a flume outlet, the flume comprising: a gulley section having an upstream inlet end at the flume inlet and a downstream outlet end, the gulley section having opposed sidewalls and a gulley floor therebetween, and a spreader section having opposed first and second lateral walls and a spreader floor therebetween, the spreader section having an upstream end connected to the downstream outlet end of the gulley section, the spreader section progressively increasing in width between the opposed first and second lateral walls in a downstream direction from the upstream end to a downstream end of the spreader section, wherein the opposed first and second lateral walls are each outwardly inclined away from a (Continued)

longitudinal axis of the spreader section by a respective angle α° for the first lateral wall and β° for the second lateral wall, in respective opposite directions, which extends from the upstream end of the spreader section to the downstream end of the spreader section, wherein the gulley section has a width of the gulley floor at the downstream outlet end of W1, the length of the spreader section between the upstream and downstream ends of the spreader section is N, and the dimensionless ratio N/W1 is within the range of from 2 to 15, and wherein the sum of α° and β° is from 10 to 25°.

20 Claims, 7 Drawing Sheets

(51) Int. Cl.
    *A23L 19/18*           (2016.01)
    *B65G 11/02*          (2006.01)
    *B65G 11/20*          (2006.01)
    *B65G 51/01*          (2006.01)
    *B65G 69/04*          (2006.01)

(52) U.S. Cl.
    CPC ............ *B65G 11/206* (2013.01); *B65G 51/01* (2013.01); *B65G 69/0441* (2013.01); *B65G 2201/0211* (2013.01)

(56) References Cited

U.S. PATENT DOCUMENTS

| | | | |
|---|---|---|---|
| 6,655,878 B1 * | 12/2003 | de Vos | A23N 3/00 406/198 |
| 7,137,325 B2 * | 11/2006 | Bajema | B65G 51/01 83/402 |
| 8,646,470 B2 * | 2/2014 | Bajema | A23N 12/023 134/182 |
| 8,726,793 B2 * | 5/2014 | Spurr | A47J 37/1214 426/438 |
| 8,839,712 B2 * | 9/2014 | Stousland | A47J 36/00 406/171 |
| 9,840,376 B2 * | 12/2017 | White | B65G 51/01 |
| 10,751,898 B2 * | 8/2020 | Justesen | B26D 7/0658 |
| 10,850,875 B2 * | 12/2020 | Abbas | A21C 9/085 |
| 2012/0231121 A1 * | 9/2012 | Dijkhuis | A23P 20/12 426/94 |
| 2016/0244264 A1 * | 8/2016 | Abbas | B65G 27/04 |

FOREIGN PATENT DOCUMENTS

| | | | | |
|---|---|---|---|---|
| GB | 2580907 B | * | 5/2021 | .............. A23L 19/18 |
| WO | WO-2009018256 A1 | * | 2/2009 | ........... A23N 12/023 |
| WO | WO-2012104215 A1 | * | 8/2012 | ........... A23L 1/0107 |

OTHER PUBLICATIONS

Written Opinion dated Apr. 15, 2020 in Application No. PCT/EP2020/051403.

Edgar, "Flume, Systems for Handling Bulk-Stored Potatoes," Flume Systems for Handling Bulk-Stored Potatoes, 1957.

Gould, "Potato Chip Manufacture," Potato Production, Processing and Technology, Elsevier Science & Technology, pp. 85-100, 1999.

\* cited by examiner

1. Unstalled

2. Appreciable Stall

3. Large Transitory Stall

4. Fully Developed Stall

5. Jet Flow

FLUME, AND METHOD, FOR SUPPLYING VEGETABLE PIECES

This application is a U.S. National Phase Application of PCT Application No. PCT/EP2020/051403 filed on Jan. 21, 2020, which claims priority to GB Application No. 1901058.6 filed on Jan. 25, 2019, the entire contents of each are incorporated herein by reference.

This invention relates to a flume for supply vegetable pieces and to a method for supplying vegetable pieces, for example to a cooking apparatus. The present invention has particular application to the supply of potato slices in the manufacture of potato chips.

It has been known for many years to produce potato chips from slices of potato which are fried in oil, usually vegetable oil. When cooking vegetable pieces, particularly by frying, using large scale commercial production processes, it is important that the cooked food pieces have consistent and predetermined product attributes, including internal moisture content. Typical conventional potato chips have a predetermined internal moisture content of about 1-2 wt % water, based on the total weight of the potato chip. Potato chips exhibit specific organoleptic properties, in combination with visual appearance, to the consumer. The consumer desirous of purchasing a potato chip has a clear expectation of these product attributes in the product. Any significant variation in the moisture content of the potato chips is not acceptable to the consumer. In particular, if the moisture content is too high, the potato chip is too soft and is perceived as stale. It is important that in any given batch of potato chips the moisture content is consistently within a statistically acceptable range about a target moisture content.

Large scale commercial production of potato chips employs fryers that cook a continuous supply of potato slices that are fed from one or more slicers, and the resultant cooked potato chips are continuously removed from the fryer. The potato slices enter an input end of the fryer and cooked potato chips exit an output end of the fryer. A typical single commercial fryer can cook potato slices at a rate of more than 2 million slices per hour. The potato slices are fed in at the input end across substantially the entire width of the fryer. Large scale commercial production of potato chips typically employs fryers that have a width of about 2 metres.

The typical commercial potato chip production apparatus includes a flume between the slicer(s) and the input end of the fryer. Potato slices in a flow of water as a carrier liquid are fed in at the input end of the flume and flow though the gulley section. The flume includes an upstream gulley section and a downstream fishtail section. The fishtail section has an upstream inlet coupled to the downstream end of the gulley section, and a downstream outlet to discharge the slices in the water onto a conveyor, which is configured to drain the water from the slices and then feed the slices into the fryer. The fishtail section increases in width between the upstream inlet and the downstream outlet, so that the flow of potato slices in the water is increased in width so as to be spread across the width of the fryer. A typical gulley section has a width which substantially corresponds to the output width of the slicer head. For example, the gulley section has a width of from 0.25 to 0.65 metres, preferably from 0.4 to 0.5 metres. Accordingly, the potato slice supply to the fryer needs to be spread by the fishtail section so as to correspond to the larger width of the fryer. The dimensions of the gulley section are selected so as to enable the slicer output to be received and to enable a high water flow rate and velocity so that potato slices do not clog within the gulley section. The length dimension of the flume is limited by the area required in the factory for the entire fryer apparatus. A typical commercial flume in a potato chip fryer apparatus has a length of from 5 to 15 metres for example about 7.5 metres.

The flume is intended to spread the distribution of potato slices uniformly across the width of the downstream outlet of the fishtail section and to provide a time-consistent supply of potato slices to the fryer. A particular problem with known flume designs is a tendency for the flow of potato slices at the downstream outlet of the fishtail section to be non-uniform. The downstream outlet may be considered to have a left-centre-right (LCR) distribution extending across the width of the flume. Ideally, the LCR distribution of the potato slices and the velocity of the potato slices is substantially constant across the width of the flume. However, for many current flume installations, the LCR distribution of the potato slices is not constant. Instead, the LCR distribution may be biased towards one side of the flume, and such bias may extend over a significant time period (for example many minutes), or alternatively the bias may unpredictably change with time. Since a typical commercial flume may have from about 1000-1500 potato slices on the fishtail section at any given time, such unpredictable variation in the supply of potato slices can significantly affect the quality of the cooked product.

Potatoes comprise about 85 wt % water and the frying process explosively dehydrates the potato slices to about 1-3 wt % water. If the supply of potato slices across the width of a fryer is not uniform, then the moisture content in the potatoes that is delivered to the fryer correspondingly is not uniform. It is necessary for the slices to be spread uniformly across the entire width of the fryer, so that the mass flow rate of vegetable pieces into the fryer is substantially uniform both with respect to the width of the fryer and with respect to time.

In any region of the fryer that receives a relatively excess supply of potato slices, the excess moisture content to be evaporated during frying causes localised cooling of the cooking oil, with the result that the potato chips may be undercooked and have an excessive moisture content. Conversely, any region of the fryer that receives a relatively insufficient supply of potato slices, the reduced moisture content to be evaporated during frying causes localised overheating of the cooking oil, with the result that the potato chips may be are overcooked, resulting in browning and possible excess acrylamide content, and have an insufficient moisture content. The resultant packaged potato chips may be non-uniform in moisture content, organoleptic properties and visually.

The Applicant has carried out some modelling of some known flume designs.

Figure 1A:
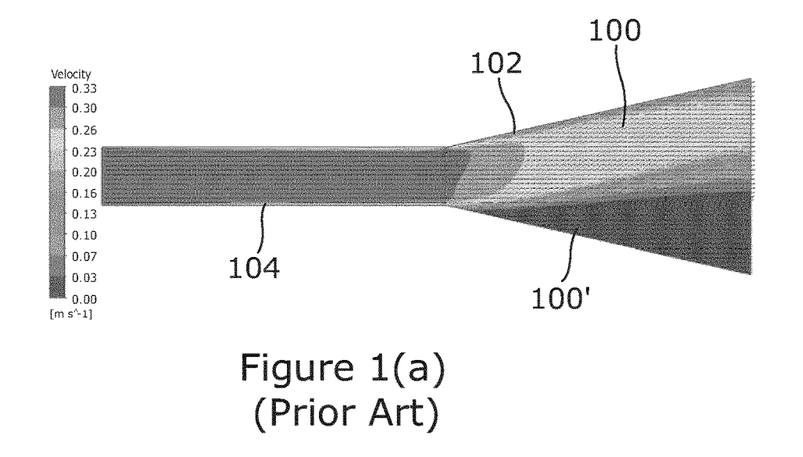
FIGS. 1(a), 1(b) and 1(c) illustrate a modelled velocity distribution of some known flume designs.
Figure 1B:
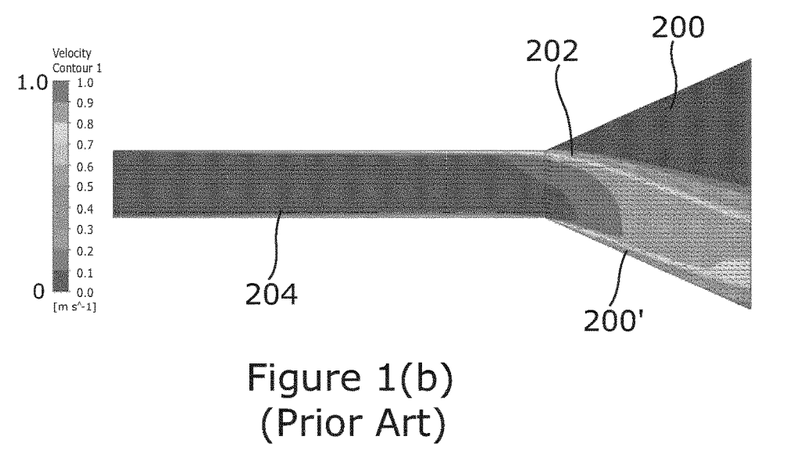
Figure 1C:
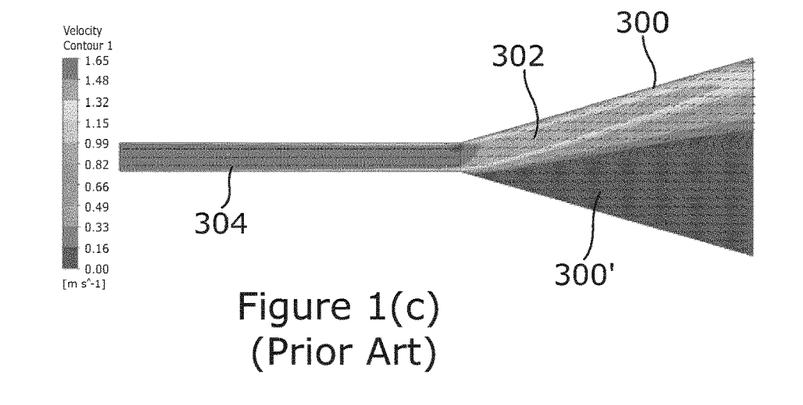

FIGS. 1(a), 1(b) and 1(c) show the modelled velocity distribution of some known flume designs.

In FIG. 1(a) the opposed lateral walls 100 of the fishtail section 102 flare outwardly from the gulley section 104 at an angle of 13°, and the fishtail section 102 is slightly shorter than the gulley section 104. It may be seen that the velocity distribution, and consequently the potato slice distribution, has a strong bias to the left side of the fishtail section (looking in a downstream direction). In FIG. 1(b) the opposed lateral walls 100 of the fishtail section 102 flare outwardly from the gulley section 104 at an angle of 24°, and also the fishtail section 102 is significantly shorter than the gulley section 104, since the larger angle permits a shorter fishtail section to achieve a give output width from a given gulley width. It may be seen that again the velocity distribution, and consequently the potato slice distribution, has a strong bias, in this design to the right side of the fishtail section (looking in a downstream direction). In FIG. 1(c) the opposed lateral walls 100 of the fishtail section 102 flare outwardly from the gulley section 104 at an angle of 16°, and also the gulley section 104 is significantly narrower than the gulley section 104 in FIG. 1(a). It may be seen that again the velocity distribution, and consequently the potato slice distribution, has a strong bias to the left side of the fishtail section (looking in a downstream direction).

It is not practically possible to significantly increase the length of the flume, for example to 5 metres or greater to try to even out the potato slice supply. This is because such a long flue cannot be efficiently incorporated into the factory, and also the supply of carrier water, and the initial velocity, need to be significantly increased to excessive values in order to be able to reliably deliver the potato slices to the fryer.

The Applicant is not aware of any prior publications which have endeavoured to explain on a theoretical basis, or to model, the flow of liquid along a flume to deliver solid pieces such as vegetable pieces, in particular potato slices, at an output end of a flume.

In a textbook entitled "Applied Fluid Dynamics Handbook," published in 1984 by Van Nostrand Reinhold Co., USA, in a Chapter entitled "Nozzles, Diffusers, and Venturis" by Blevins, R., at section 7.4 (entitled Theoretical Diffuser Performance) and section 7.5 (entitled Diffuser Pressure Recovery Coefficient) on pages 144 to 155, various aspects of diffusers are disclosed. The disclosures of Blevins are solely concerned with gas flows, for example in jet engines, and is not concerned with liquid flows, and not concerned with liquid flows which act as carriers for solid products such as food pieces.

Figure 2:
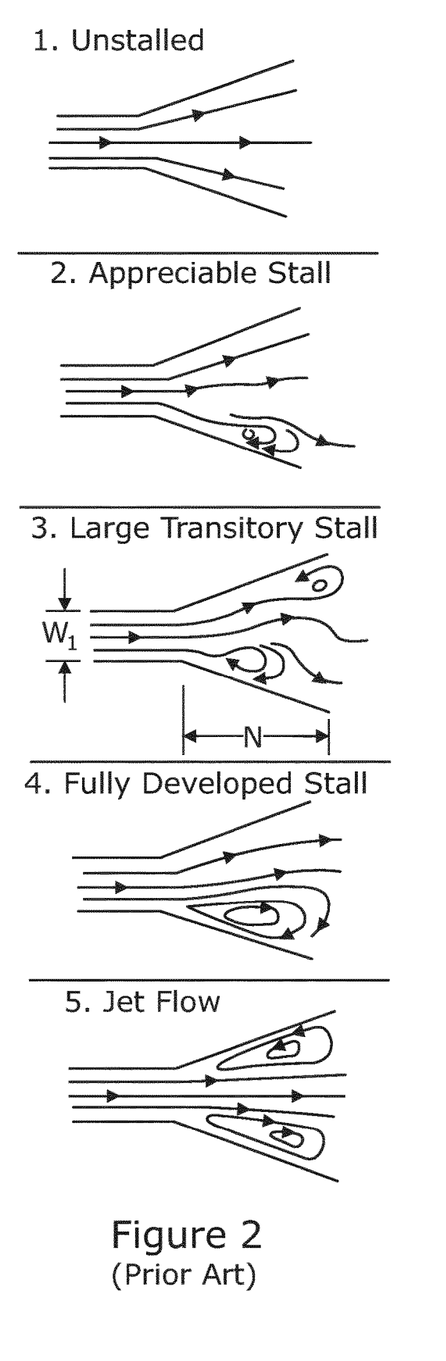
FIG. 2 illustrates five different stall regimes for a known two-dimensional diffuser for gas flow.

Blevins identifies five different stall regimes for a two-dimensional diffuser, as illustrated in FIG. 2. The diffuser has two parallel walls on the input side and two diverging walls on the output side. Blevins identifies three diffuser design parameters that may affect the stall regime, namely the diffuser angle $2\theta°$, where $\theta$ is the angle of each diverging wall to its respective parallel wall, W1 which is the width of the input defined between the two parallel walls, and N which is the length of the two diverging walls, measured along the longitudinal axis of the two-dimensional diffuser.

Figure 3:
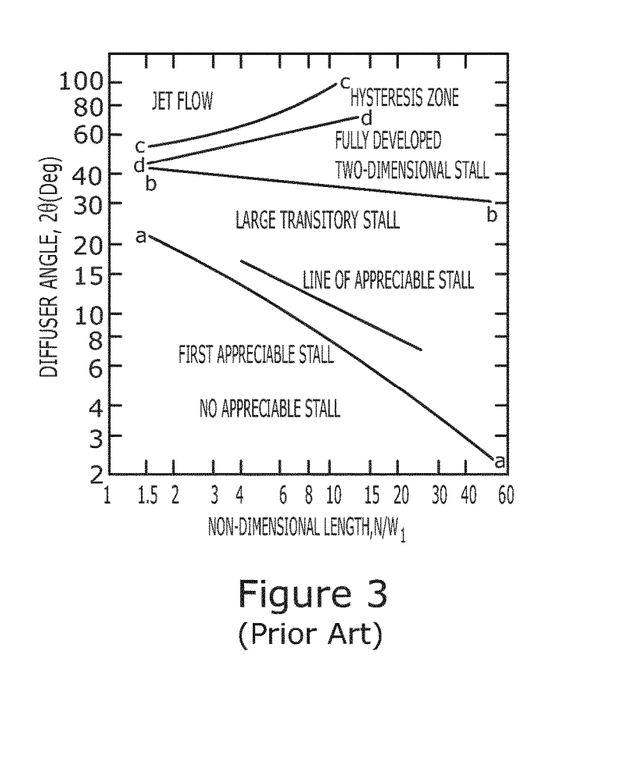
FIG. 3 is a graph showing the known stall regimes for gas flow in a two-dimensional straight walled diffuser, as a function of the diffuser angle $2\theta°$ and the non-dimensional length parameter $N/W1$.

FIG. 3 is a graph from FIG. 7-7(a) of Blevins showing the stall regimes for such two-dimensional straight walled diffusers, as a function of the diffuser angle $2\theta°$ and the non-dimensional length parameter N/W1, where $2\theta°$, N and W1 are defined above.

It may be seen that lower diffuser angles $2\theta°$ and lower non-dimensional length N/W1 tend to reduce stalling of the gaseous flow.

These parameters have no direct relevance to liquid flows carrying solids such as vegetable pieces in a substantially horizontal flume. Moreover, when such lower angles and lower non-dimensional length are interpreted in the context of a flue for use in a commercial vegetable piece processing line, for example a potato chip production line, either the total length of the flume is too high to achieve the desired "no appreciable stall" effect, or the fryer width must be reduced to achieve the desired "no appreciable stall" effect, neither of which options is commercially acceptable for incorporation into the production line.

There is a need in the art to be able to supply vegetable pieces using a flume which can achieve a uniform product distribution across the downstream process width, and which is also uniform with respect to time.

There is a need in the art for a flume for supplying vegetable pieces, and an associated supplying method using the flume, which can reliably provide a desired product distribution of vegetable pieces, for example potato slices, for a cooking step, for example in a fryer, when a large mass flow rate of the vegetable pieces, as used for example in the large-scale commercial production of potato chips, is required to be supplied.

In particular, there is a need for the product distribution to achieve a controlled mass flow rate of the vegetable pieces, and consequently a controlled mass flow rate of the moisture content within the vegetable pieces, across the width of a downstream process such as cooking, which is uniform across the downstream process width, and also uniform with respect to time.

Furthermore, there is a need for such a flume for supplying vegetable pieces, and an associated supplying method using the flume, which can be retrofitted into an existing commercial production line with minimal disruption, or replacement or movement of existing components, to improve the uniformity of the LCR distribution of vegetable pieces, for example potato slices, for a cooking step, for example in a fryer, across the width of the cooking apparatus and with respect to time.

The present invention aims at least partially to meet one or more of these needs in the art.

The present invention accordingly provides a flume for supplying vegetable pieces in a supply of liquid, the flume extending between a flume inlet and a flume outlet, the flume comprising:
  a gulley section having an upstream inlet end at the flume inlet and a downstream outlet end, the gulley section having opposed sidewalls and a gulley floor therebetween, and
  a spreader section having opposed first and second lateral walls and a spreader floor therebetween, the spreader section having an upstream end connected to the downstream outlet end of the gulley section, the spreader section progressively increasing in width between the opposed first and second lateral walls in a downstream direction from the upstream end to a downstream end of the spreader section, wherein the opposed first and second lateral walls are each outwardly inclined away from a central longitudinal axis of the flume by a respective angle $\alpha°$ for the first lateral wall and $\beta°$ for the second lateral wall, in respective opposite directions, which extends from the upstream end of the spreader section to the downstream end of the spreader section,
  wherein the gulley section has a width of the gulley floor at the downstream outlet end of W1, the length of the spreader section between the upstream and downstream ends of the spreader section is N, and the dimensionless ratio N/W1 is within the range of from 2 to 15, and
  wherein the sum of $\alpha°$ and $\beta°$ is from 10 to 25°.

The present invention further provides a method of supplying vegetable pieces, the method comprising the steps of:
  (a) providing a flume according to the present invention; and
  (b) providing a supply of liquid containing the vegetable pieces into the gulley section of the flume thereby forming (i) a first flow of the vegetable pieces in the liquid from the upstream inlet end of the gulley section at the flume inlet to the downstream outlet end of the gulley section and thereafter (ii) a second flow, downstream of the first flow, of the vegetable pieces in the liquid from the downstream outlet end of the gulley section to the downstream end of the spreader section, wherein in the second flow the vegetable pieces are spread across the width of the spreader section.

Preferred features are defined in the dependent claims.

The present inventors have found that the use of the specific flume construction and corresponding process step of spreading vegetable pieces in a flow of a liquid carrier using the flume unexpectedly improves the uniformity of the LCR distribution of vegetable pieces, for example potato slices, for a cooking step, for example in a fryer, across the width of the cooking apparatus and with respect to time. The LCR distribution is more uniform across the flume width, and more stable with respect to time. There is a reduced, and typically minimal, incidence of unpredictable random localised "jetting" of the vegetable piece/carrier liquid flow at one side of the flume, which is correspondingly coupled with a low velocity/low vegetable piece product density at an opposite side of the flume.

The present inventors have found that a particular combination of the flume angle, which is the sum of $\alpha+\beta°$, where $\alpha$ and $\beta$ are the respective angles of inclination of the opposed lateral walls of the flume to the central longitudinal axis of the flume, and the non-dimensional length $N/W1$, where N is the length of the spreader section and W1 is the width of the floor of the gulley section, can provide a highly stable uniform flow of vegetable pieces at the output end of the flume.

Unexpectedly, the specific control parameters for the flume angle $(\alpha+\beta°)$ and the non-dimensional length $N/W1$ which have been found to achieve a highly stable uniform flow of vegetable pieces at the output end of the flume are within the zone of appreciable stall of FIG. 3 which represents known stall regimes for gas flows in a two-dimensional straight walled diffuser.

In other words, the present inventors have unexpectedly found that the combination of fundamental parameters of the flume design, namely flume angle $(\alpha+\beta°)$ and the non-dimensional length $N/W1$, to achieve the desired technical effect of uniform distribution of vegetable pieces in a flow of a liquid carrier medium is different from the design of a known two-dimensional straight walled diffuser to achieve a stall regime exhibiting no appreciable stall in a gas flow.

The flume design enables a uniformly high degree of vegetable piece distribution across the flume, and stalling and fluid backflows are substantially absent. Since the carrier fluid is a liquid, the effect of gravity may affect the liquid flow and the flow of the vegetable pieces, which would not be significant in a gas flow as illustrated in FIG. 3. Also, since solid vegetable pieces are being conveyed by the carrier liquid, the effect of momentum and inertia of the solid vegetable pieces may affect the flow of the vegetable pieces, which would not be significant in a gas flow as illustrated in FIG. 3. For example, the vegetable pieces have inertia in the liquid flow and so tend to lag behind the liquid flow.

The present inventors unexpectedly found that an even water flow does not necessarily provide an even flow of vegetable pieces across the width of any flume. It was previously assumed that merely providing an even water flow would provide an even flow of vegetable pieces, but this assumption was found by the present inventors to be incorrect. The preferred embodiments of the present invention provide a flume design which can not only provide even and uniform liquid flow but can also provide an even and uniform flow of vegetable pieces, for example potato slices, in the liquid flow, the flow of vegetable pieces being substantially absent of time and position (LCR) based surging.

It has been found by the present inventors that by providing an even delivery of vegetable pieces in the liquid flow into the gulley section, and by maintaining a liquid flow rate (which is selected based on the vegetable piece flow rate) and velocity in the gulley section (for example at least 0.6 metres/second) to maintain suspension of the vegetable pieces in the liquid in the gulley section, subsequent surging, with respect to both time and position (LCR), of the vegetable pieces in the spreader section can be substantially avoided.

The flume and associated method of the invention are scalable, and can be employed for various mass flow rates of vegetable pieces therethrough.

The high degree of uniformity of the LCR distribution ensures that each vegetable piece is subjected to uniform and consistent downstream processing conditions and thus receives the same product explosive dehydration, and optional subsequent drying, to achieve the desired final moisture content. This in turn ensures that the resultant snack food product such as a potato chip, produced by the cooking step, such as the frying step, consistently has a high level of product uniformity, and the desired target combination of flavour, organoleptic properties and shelf life in the resultant cooked vegetable product such as potato chips.

An embodiment of the present invention will now be described, by way of example only, with reference to the accompanying drawings in which.

Figures 4, 5, 6:
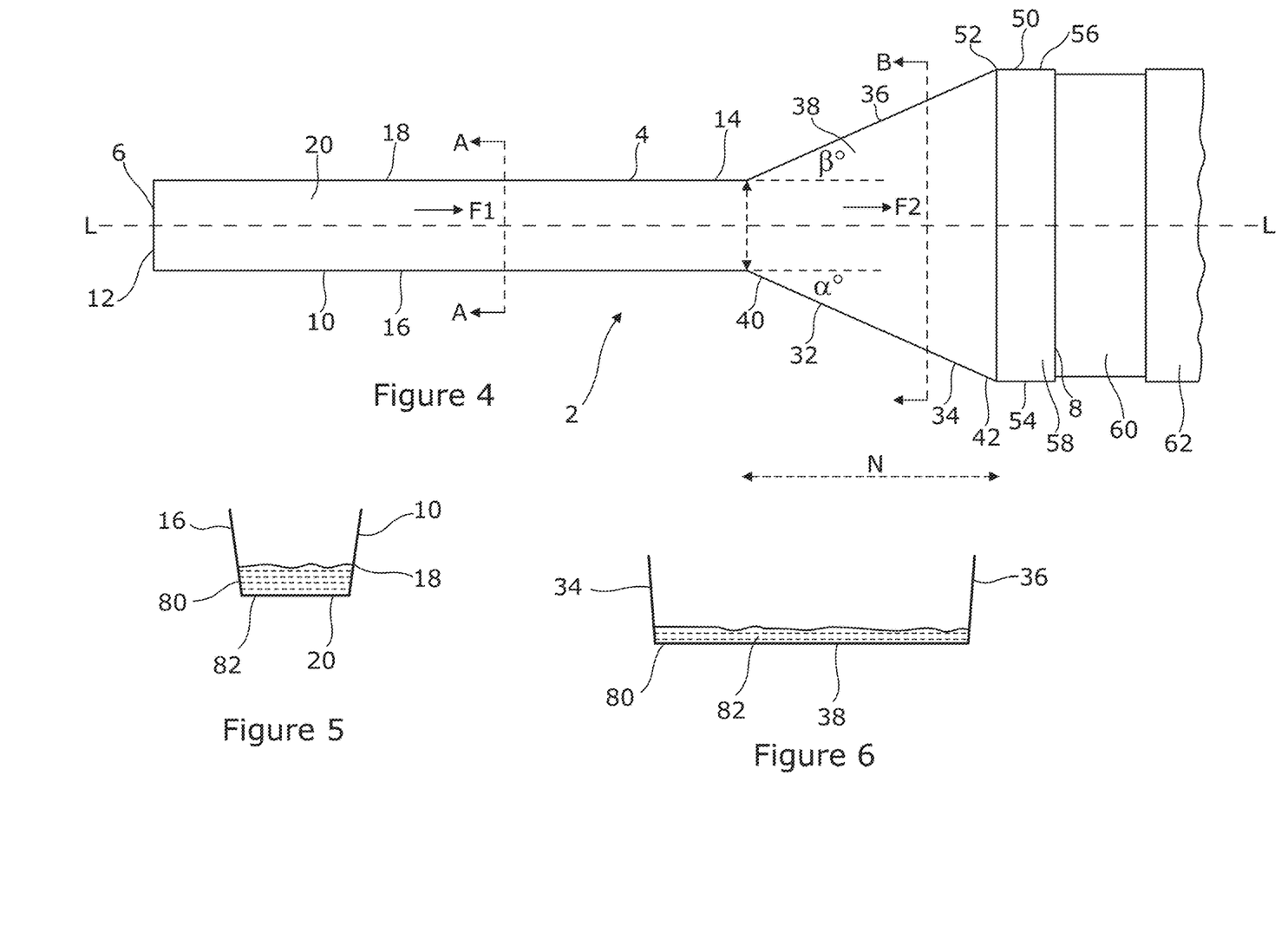
FIG. 4 is a schematic plan view of a flume for supplying potato slices, prior to cooking, according to an embodiment of the present invention.
FIG. 5 is a schematic section on line A-A in FIG. 4.
FIG. 6 is a schematic section on line B-B in FIG. 4.
Figure 7:
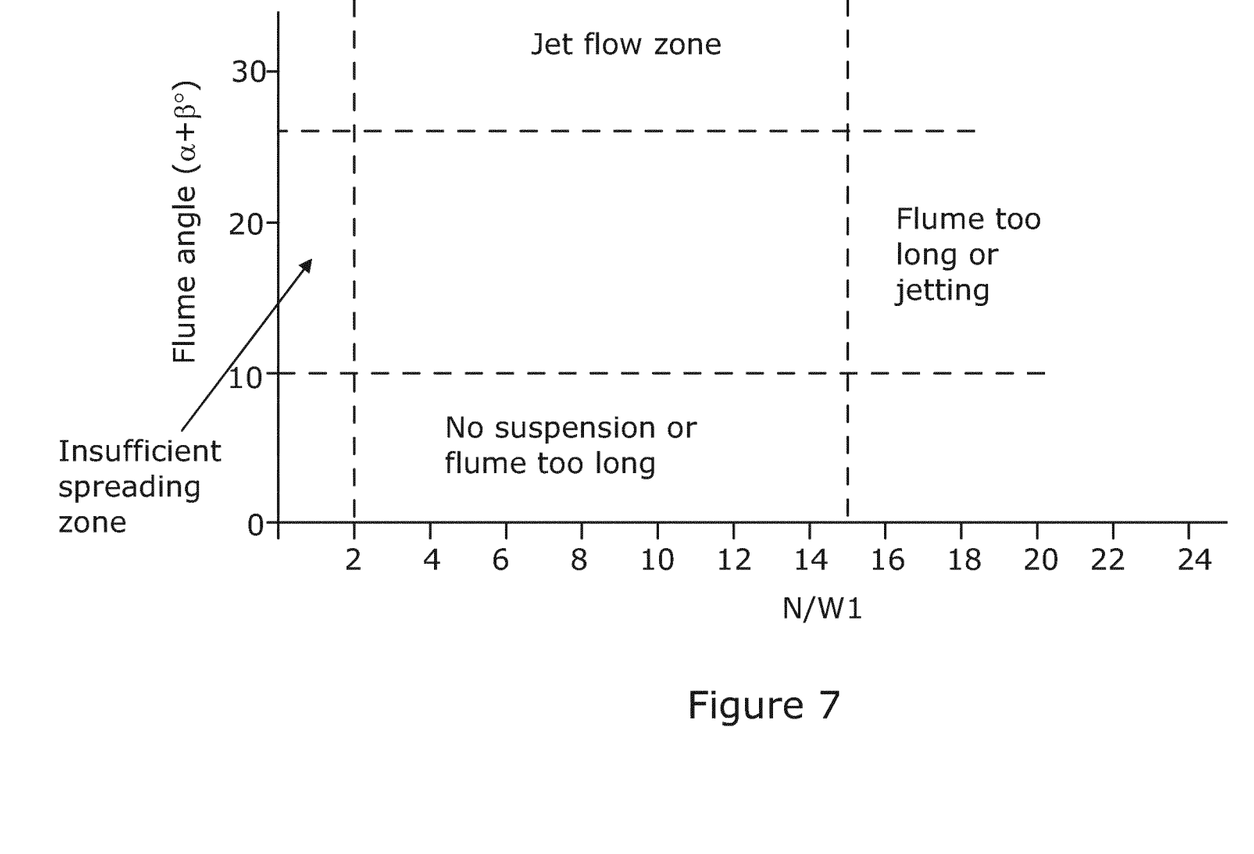
FIG. 7 is a graph showing the behaviour of a flume according to the present invention as a function of the flume angle $(\alpha+\beta°)$ and the non-dimensional length $N/W1$.
Figure 8:
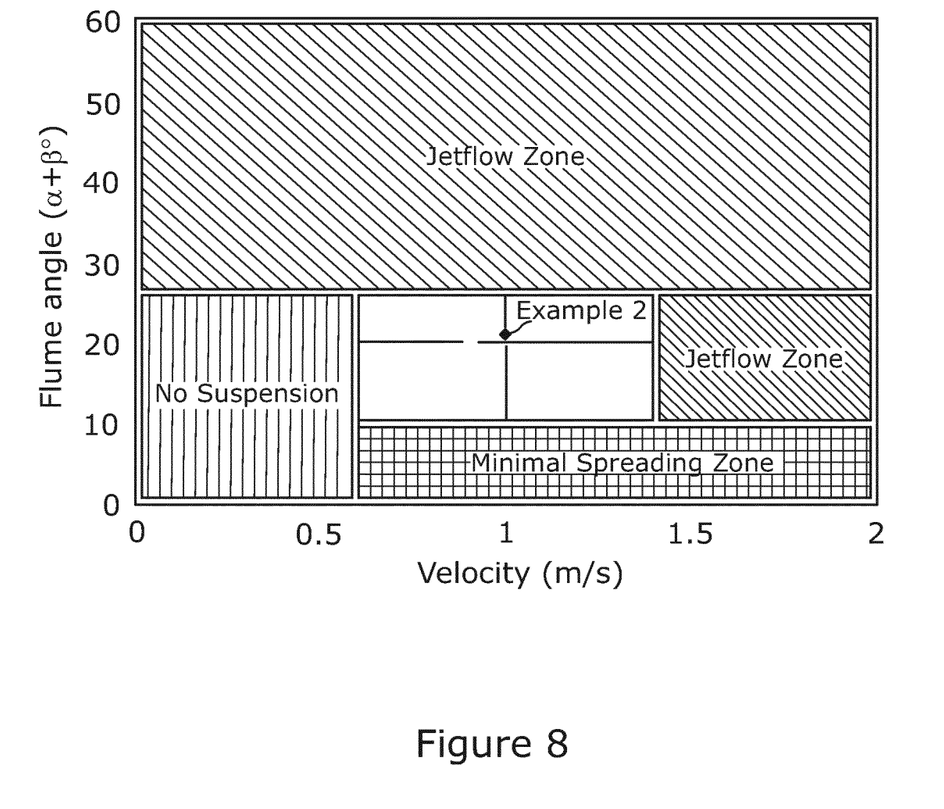
FIG. 8 is a graph showing the behaviour of a flume according to the present invention as a function of the flume angle $(\alpha+\beta°)$ and velocity of the carrier liquid in the gulley section.

An embodiment of an apparatus for supplying potato slices in water, prior to cooking of the potato slices by frying in oil to form potato chips, according to one aspect of the present invention is illustrated in FIGS. 4 to 6.

Referring to FIGS. 4 to 6, an apparatus, designated generally as 2, for separating supplying vegetable pieces in a supply of liquid, or example potato slices in a supply of water, comprises a flume 4. The potato slices typically have a thickness of 1 to 2.5 mm, more typically about 1.3 mm (51 thousandths of an inch). Potato slices for potato chip manufacture typically have a width varying from 40 to 120 mm, with a significant proportion being "medium size" slices within the 60 to 80 mm range.

The flume 4 extends between a flume inlet 6 and a flume outlet 8. Typically, the entire flume 4 has a length of from 10 to 15 metres. The flume comprises a gulley section 10 having an upstream inlet end 12 at the flume inlet 8 and a downstream outlet end 14. The gulley section 10 is typically linear, i.e. straight in plan view, but may alternatively have some curvature in plan view. The gulley section 10 is substantially U-shaped in cross-section and has opposed sidewalls 16, 18 and a gulley floor 20 therebetween. In the illustrated embodiment, the gulley section 10 has a constant width of the gulley floor 20 along the length thereof. Typically, the upstream inlet end 12 of the gulley section 10 has a width of the gulley floor 20 which is from 0.25 to 0.65 metres, for example from 0.4 to 0.55 metres.

In the illustrated embodiment, the gulley section 10 is downwardly inclined towards the downstream outlet end 14 at an angle to the horizontal of from 0.5 to 5 degrees, typically from 1 to 3 degrees, for example about 2 degrees.

In the illustrated embodiment, the opposed sidewalls 16, 18 of the gulley section 10 are inclined to the vertical at an angle of up to 20°, typically from 5 to 7°, in a direction upwardly and outwardly away from a central longitudinal axis L-L of the flume 4.

The flume 4 further comprises a spreader section 32 having opposed first and second lateral walls 34, 36 and a spreader floor 38 therebetween. The spreader section 32 has an upstream end 40 connected to the downstream outlet end 14 of the gulley section 10.

The spreader section 32 progressively increases in width between the opposed first and second lateral walls 34, 36 in a downstream direction from the upstream end 40 to a downstream end 42 of the spreader section 32. The opposed first and second lateral walls 34, 36 are each outwardly inclined away from the central longitudinal axis L-L of the flume 4 section by a respective angle $\alpha°$ for the first lateral wall 34 and $\beta°$ for the second lateral wall 36, in respective opposite directions, the central longitudinal axis L-L extending from the upstream end 40 of the spreader section 32 to the downstream end 42 of the spreader section 32.

The opposed first and second lateral walls 34, 36 are linear. Each first and second lateral wall 34, 36 diverges at a respective constant angle, $\alpha°$ for the first lateral wall 34 and $\beta°$ for the second lateral wall 36, relative to the central longitudinal axis L-L.

In the illustrated embodiment, the downstream end of the spreader floor 38 of the spreader section 32 has a width W2 which is a factor of from 2 to 8, or a factor of from 4 to 6, greater than the width W1 of the gulley floor 20 at the downstream outlet end 14 of the gulley section 10. Typically, the downstream end 42 of the spreader section 32 has a width of the spreader floor 38 which is from 1 to 2.5 metres.

In the illustrated embodiment, the spreader section 32 is downwardly inclined towards the flume outlet 8 at an angle to the horizontal of from 0.5 to 5 degrees, typically from 1 to 3 degrees, for example about 2 degrees.

In the illustrated embodiment, the spreader floor 38 is a planar surface, and is free of any three-dimensional elements or three-dimensional surfaces extending upwardly therefrom. Such a planar surface provides the advantage that slice build-up in the spreader section, which would cause both time and position based surging, is minimised, and typically avoided.

In the illustrated embodiment, the opposed first and second lateral walls 34, 36 of the spreader section 32 are inclined to the vertical at an angle of up to 20°, typically from 5 to 7°, in a direction upwardly and outwardly away from the central longitudinal axis L-L.

In accordance with the present invention, the gulley section 10 has a width of the gulley floor 20 at the downstream outlet end 14 of W1, the length of the spreader section 32 between the upstream and downstream ends 40, 42 of the spreader section 32 is N, and the dimensionless ratio N/W1 is within the range of from 2 to 15, preferably within the range of from 6 to 13. Additionally, in accordance with the present invention the sum of $\alpha°$ and $\beta°$ is from 10 to 25°, preferably from 14 to 24°, more preferably from 20 to 22°. Preferably, $\alpha°$ and $\beta°$ are the same and the spreader section 32 is symmetrical on opposite sides of the central longitudinal axis L-L.

In the illustrated embodiment, the flume 4 further comprises a discharge chute 50 connected at an upstream end 52 thereof to the downstream end 42 of the spreader section 32. The discharge chute 50 has opposed sidewalls 54, 56 and a discharge floor 58 therebetween. The discharge chute 50 is typically downwardly inclined at an angle to the horizontal which is greater than the angle to the horizontal of the spreader section 32. For example, the discharge chute 50 may be downwardly inclined at an angle to the horizontal of from 2 to 10 degrees, optionally from 4 to 8 degrees, further optionally about 5 degrees. Typically, the discharge chute 50 has a constant width along the length thereof. Typically, the discharge floor 58 is a planar surface and is free of any three-dimensional elements or three-dimensional surfaces extending upwardly therefrom.

In the illustrated embodiment, the spreader section 32 supplies the spread vegetable pieces to the discharge chute 50 which then discharges the spread vegetable pieces onto a conveyor 60, which then conveys the vegetable pieces to a cooking apparatus 62 such as a fryer. Alternatively, the discharge chute 50 may discharge the spread vegetable pieces into a dip tank (not shown).

However, in alternative embodiments, the discharge chute 50 is omitted. The spreader section 32 may supply the spread vegetable pieces directly onto a conveyor 60, or into a dip tank, onto any other apparatus for further processing or treating the vegetable pieces.

Figure 9:
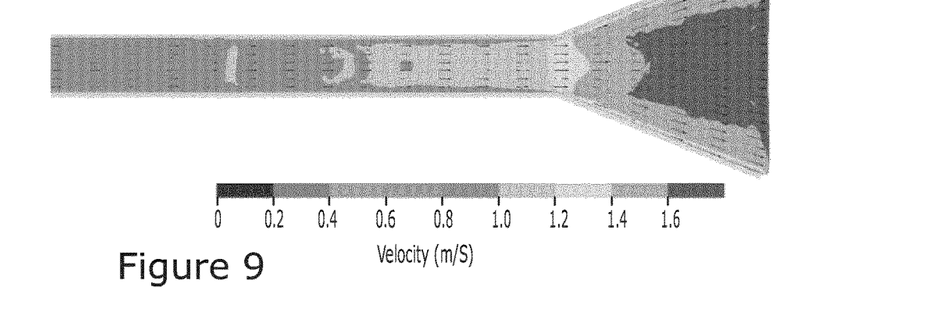
FIG. 9 illustrates a modelled velocity distribution of a flume according to another embodiment of the present invention.
Figure 10:
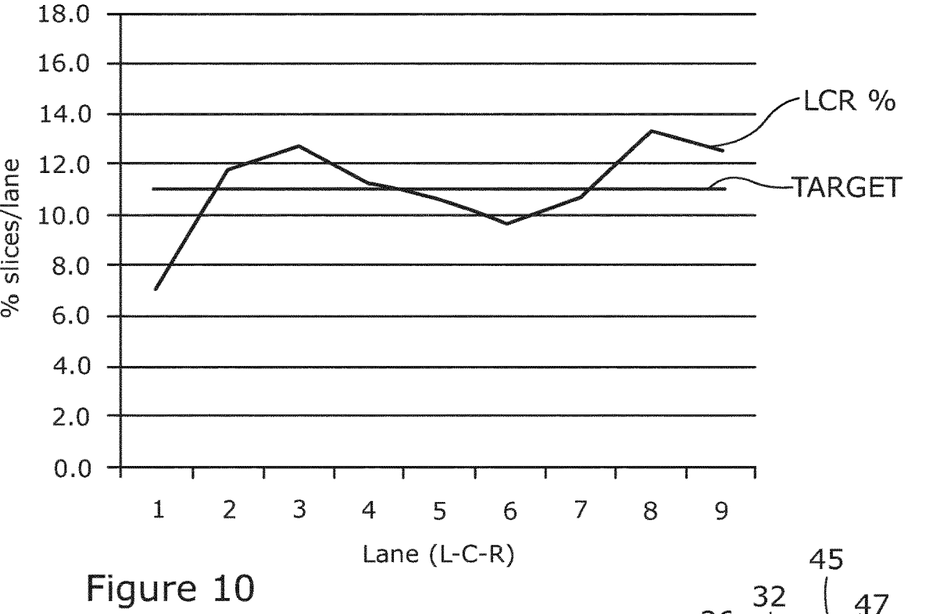
FIG. 10 illustrates the LCR potato slice distribution using the flume of FIG. 9.

An alternative embodiment of a flume according to the present invention having a spreader section with linear inclined opposed lateral walls is shown in FIG. 9.

Figure 11:
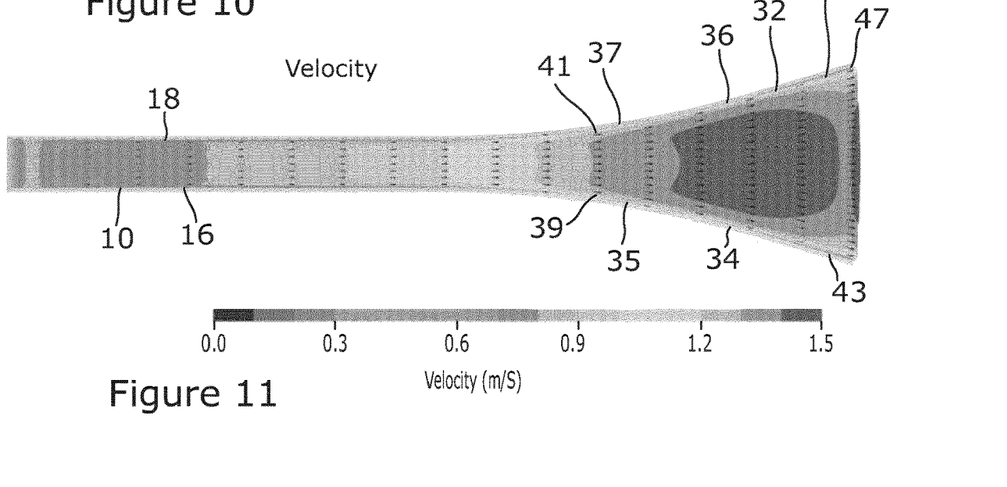
FIG. 11 illustrates a modelled velocity distribution of a flume according to a further embodiment of the present invention.

In a further embodiment of a flume according to the present invention, as shown in FIG. 11 the flume has a "trumpet-like" design. In such a "trumpet-like" design instead of there being a sharp corner between the parallel sidewalls of the gulley section and the respective opposed lateral walls of the spreader section as shown in FIG. 4, downstream of the parallel sidewalls of the gulley section a curvature is provided to assist smoothing out of the flow from the gulley section to the spreader section. Accordingly, as shown in FIG. 11 the opposed first and second lateral walls 34, 36 include a curved portion 35, 37 which connects to a respective sidewall 16, 18 of the gulley section 10, and the spreader section 32 is trumpet-shaped in plan.

In the specific embodiment of FIG. 11, the "trumpet-like" design provides that the respective opposed lateral walls 34, 36 for the spreader section 32 may comprise an upstream smoothly and continuously convexly curved, with either a constant or varying radius of curvature, transition section 39, 41 connected to a downstream linear, i.e. straight, section 43, 45 and the opposed lateral walls 34, 36 of the spreader section 32 terminate in a linear-walled frustoconical end section 47.

Figure 12A:
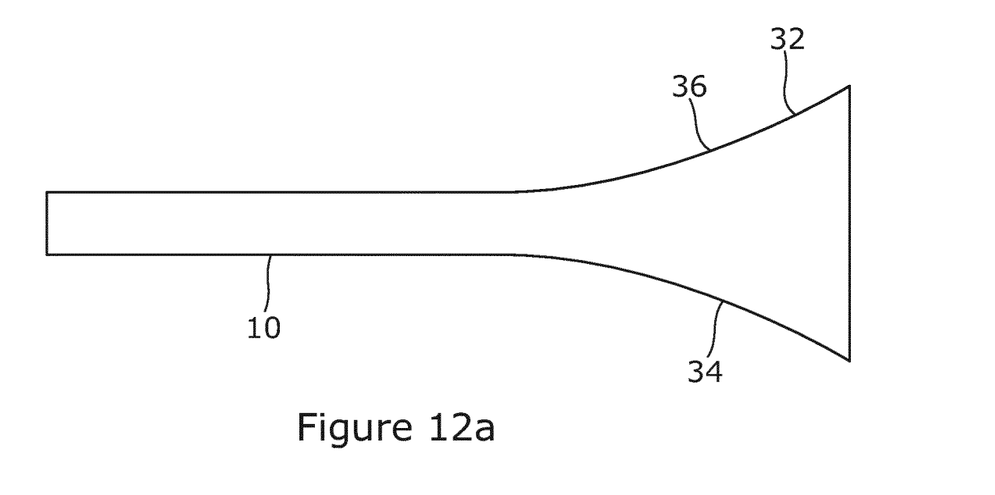
FIGS. 12a and 12b illustrate alternative trumpet-like designs for the spreader section of the flume according to further embodiments of the present invention.

Alternatively, as shown in FIG. 12a (which is not to scale for clarity of illustration) the respective opposed lateral walls 34, 36 for the spreader section 32 are smoothly and continuously convexly curved, with either a constant or varying radius of curvature in the "trumpet-like" design, extending between the upstream and downstream ends of the spreader section 32, which is connected to the gulley section 10.

Figure 12B:
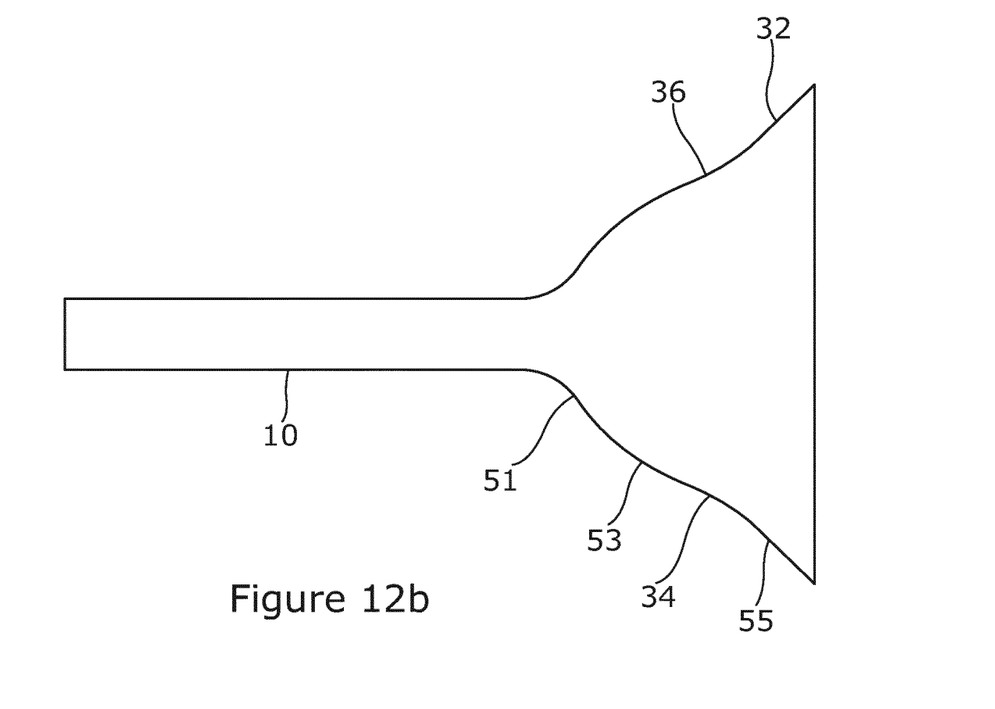

In another embodiment of the "trumpet-like" design as shown in FIG. 12b (which is not to scale for clarity of illustration), the respective opposed lateral walls 34, 36 for the spreader section 32 have an inflected wall providing a "bell-like" shape, and may comprise an upstream smoothly and continuously convexly curved transition section 51, an intermediate concavely curved intermediate section 53 and a downstream convexly curved section 55. Each curved section may have either a constant or varying radius of curvature. The downstream section 55 may alternatively have linear, i.e. straight, walls and for a frustoconical end. The transition section 51 is connected to the gulley section 10.

In each embodiment of the "trumpet-like" design, the angles α° and β° on opposite sides of the longitudinal axis are defined between the longitudinal axis and a linear (i.e. straight) line extending from the upstream end of the spreader section 32 to the downstream end of the spreader section 32. The physical respective opposed lateral walls 34, 36 (in particular the base portion thereof) for the spreader section 32 of the "trumpet-like" design are substantially aligned with the linear lines defining the respective angles α° and β°, whereas for the linear walled design of FIGS. 4-6 and FIG. 9 the physical respective opposed lateral walls 34, 36 for the spreader section 32 are coincident with the linear lines defining the respective angles α° and β°.

In the "trumpet-like" design, the distance N is measured from the free downstream end of the spreader section 32 and the end of the linear walls 16, 18 defining the gulley section 10. The "trumpet-like" design provides a smoother transition between the gulley and spreader sections 10, 32, which can allow an increase in N, or an increase in the angles α° and β° for a given N, without compromising spreader performance in providing a uniform flow distribution of vegetable pieces across the width of the flume outlet.

The flume is employed in a method of supplying vegetable pieces in accordance with the present invention.

In the method, the flume as described above is provided.

A supply of liquid containing the vegetable pieces is fed into the gulley section 10 of the flume 4. In a preferred embodiment, the upstream inlet end 12 of the gulley section 10 is provided with the supply of liquid, e.g. water, containing a plurality of vegetable pieces, e.g. potato slices for the manufacture of potato chips, from the outlet of a potato slicer. Preferably, a constant flow of water containing potato slices enters the gulley section 10, and a corresponding constant flow of water containing potato slices exits the gulley section 10. The liquid flow velocity in the gulley section 10 preferably has a velocity of from 0.6 to 1.4 metres/second, for example from 0.6 to 1.0 metres/second.

A first flow F1 of the vegetable pieces in the liquid is formed, the first flow extending from the upstream inlet end 12 of the gulley section 10 at the flume inlet 6 to the downstream outlet end 14 of the gulley section 10.

Thereafter a second flow F2, downstream of the first flow F1, of the vegetable pieces in the liquid is formed, the second flow extending from the downstream outlet end 14 of the gulley section 10 to the downstream end 42 of the spreader section 32. In the second flow F2, the vegetable pieces are spread across the width of the spreader section 32.

At the downstream end 42 of the spreader section 32 the second flow F2 typically has a velocity that is higher than the velocity of the first flow F1 and is greater than 1.0 metres/second. The increase in velocity results from the downward inclination of the flume 4 and the spreader section 32.

Across a surface area of the spreader floor 38 a minimum velocity of the second flow F2 is at least 0.6 metres/second. Such a minimum velocity is higher than a typical stall velocity of vegetable slices in water, with the result that the flow of vegetable slices is spread substantially uniformly across the width of the spreader section 32 with a substantially uniform velocity profile of the second flow F2 across the width of the spreader section 32.

The discharge chute 50 exits onto the output conveyor 60, typically an endless belt conveyor, which is located below the discharge chute 50 and may be oriented along or at an angle to, even perpendicular to, the flow direction. The output conveyor 60 may be horizontal or inclined at a small angle, such as up to 10 degrees, to the horizontal. The output conveyor 60 typically has a translational velocity of from 0.1 to 0.8 m/s, optionally 0.2 to 0.5 m/s.

The output conveyor 60 is mounted above a water recovery tank 62. The output conveyor 60 is water permeable, for example comprising an endless belt composed of metal mesh, such as stainless steel mesh. The water can drain off the potato slices and then can drip through the mesh into the recovery tank 62 for subsequent re-use, optionally after clean-up such as filtering.

The vegetable pieces are supplied by the conveyor 60 to a cooking apparatus 64, optionally a fryer. Accordingly, the flume outlet 8 discharges the vegetable pieces in the liquid onto the conveyor 60. The conveyor 60 conveys the vegetable pieces to the cooking apparatus 64. The conveyor 60 is permeable to liquid and the liquid is at least partially drained from the vegetable pieces on the conveyor 60, so that minimum free water on the vegetable pieces is introduced into the cooking apparatus 64.

In a modified embodiment of the present invention, the flume may be incorporated into a multi-tier flume assembly. In such an assembly, an upper flume is disposed above a lower flume, and the upper and lower flumes each output onto a respective conveyor, for conveying the pieces to a cooking apparatus, which may be a common cooking apparatus or respective cooking apparatus, or into a common dip tank, or respective dip tanks. The upper and lower flumes may be fed by the output from a common slicer had, which output has been split to provide upper and lower flows, or may be fed by respective slicer heads.

Although the embodiment of the present invention is described with respect to potato slices, any shaped pieces of any vegetables may be spread by the apparatus and method of the invention; for example sweet potato pieces for forming sweet potato French fries. Furthermore, although the embodiment of the present invention is described with respect to spreading the vegetable pieces prior to cooking, the spread vegetable pieces may be otherwise treated; for example seasoned prior to packaging. Still further, although the vegetable pieces are flowed along the flume using water as a carrier medium, which water may contain additives such as antioxidants, preservatives, etc., any other liquid medium may be employed as the carrier medium; for example a medium comprising or consisting of cooking oil such as sunflower oil.

The various aspects of the present invention will now be described in greater detail with reference to the following non-limiting Examples.

EXAMPLE 1

Various flume structures were modelled to represent the behaviour of the flume with regard to LCR solid product distribution across the width of the flume using a liquid carrier. The results are shown in FIG. 7 which is a graph showing the behaviour of a flume according to the present invention as a function of the flume angle (α+β°) and the non-dimensional length N/W1.

Based on the experimental modelling, it was found that if the flume angle (α+β°) is above 25°, this can result in jetting of the supply of solid products in the carrier liquid, with the undesirable result that a narrow jet of the solid products in the carrier liquid can be located along only a small proportion of the width of the flume. The LCR distribution is accordingly poor and unpredictable. The jet can spontaneously and randomly dynamically migrate across the width of the flume.

Furthermore, it was found that if the flume angle (α+β°) is below 10°, there is minimal spreading of the supply of solid products in the carrier liquid, with the undesirable result that the flume is excessively long, or the output width is excessively narrow, for incorporation into a commercial food production facility, in particular a potato chip fryer production line. Furthermore, with such a long flume the flow velocity is reduced along the length of the flume, and can fall below a minimum suspension velocity. This means that solid products in the carrier liquid can stall and build up a static body of products upstream of the flume outlet. Such a flume geometry also cannot be effectively retrofitted into any existing potato chip fryer production line.

It was further found that if the non-dimensional length N/W1 is above 15, then the spreading section of the flume is too long. As explained above, excessive length of the spreading section can cause stalling at low velocity and cannot readily be installed in a potato chip fryer production line. Furthermore, minimising the width of the gulley section can cause excessively high velocities, causing jetting, which is undesirable as explained above.

It was still further found that if the non-dimensional length N/W1 is below 2, then there is minimal spreading of the supply of solid products in the carrier liquid, which is undesirable as explained above.

The flume structures were also modelled to provide experimental data shown in FIG. 8 which is a graph showing the behaviour of a flume according to the present invention as a function of the flume angle (α+β°) and velocity of the carrier liquid in the gulley section.

As for FIG. 7, FIG. 8 shows that, based on the experimental modelling, it was found that if the flume angle (α+β°) is above 25°, this can result in jetting of the supply of solid products in the carrier liquid, and if the flume angle (α+β°) is below 10°, there is minimal spreading of the supply of solid products in the carrier liquid.

Furthermore, FIG. 8 shows that it was found that if the velocity of the carrier liquid in the gulley section is below 0.6 metres/second, then the solid products are not sufficiently suspended in the carrier liquid. It was also found that if the velocity of the carrier liquid in the gulley section is above 1.4 metres/second, this can result in jetting of the supply of solid products in the carrier liquid.

These experimental data, although based on modelling, show that in the flume the dimensionless ratio N/W1 should be within the range of from 2 to 15, and the sum of α° and β° should be from 10 to 25° to achieve the desired uniform LCR spreading of the products across the flume outlet, and that preferably in the gulley section the liquid carrier flow has a velocity of from 0.6 to 1.4 metres/second.

EXAMPLE 2

A flume having the structure shown in FIG. 9 (which is not drawn to scale) was provided. This flume had a dimensionless ratio N/W1 of about 6.43, and the sum of α° and β° was 21°. The gulley section and the spreader section, i.e. fishtail ramp, were each downwardly inclined in the flow direction at an angle to the horizontal of 2 degrees.

It may be see that the LCR distribution modelled in FIG. 9 was substantially uniform.

When the physical flume was used to spread potato slices in a flow of water, with a water velocity in the gulley section of from 1 to 1.2 metres/second, the LCR slice distribution shown in FIG. 10 was achieved. The LCR slice distribution is expressed as % of slices per lane, the width of the output end of the flume having been notionally divided into nine consecutive lanes. This data was achieved by physically measuring slices in each respective lane over a statistically significant time period. This LCR slice distribution result is substantially uniform and is within a statistically acceptable range about a target slice distribution.

EXAMPLE 3

A flume having the structure shown in FIG. 11 (which is not drawn to scale) was provided. This flume had a dimensionless ratio N/W1 of about 8.4, and the sum of α° and β° was 20°. The gulley section and the spreader section, i.e. fishtail ramp, were each downwardly inclined in the flow direction at an angle to the horizontal of 2 degrees. In this Example, rather than having linear inclined opposed lateral walls of the spreader section as shown in FIG. 9, the flume has a "trumpet-like" design, as described above. In the illustrated "trumpet-like" design instead of there being a sharp corner between the parallel sidewalls of the gulley section and the respective opposed lateral walls of the spreader section as shown in FIG. 9, the parallel sidewalls of the gulley section and the respective opposed lateral walls for the spreader section are connected by a smoothly curved intermediate section and the inclined opposed lateral walls of the spreader section are continuously and smoothly curved with a large radius of curvature and terminate in a linear-walled frustoconical end section. The angle between the linear line extending between the upstream and downstream ends of the spreader section and the longitudinal axis on opposite sides of the longitudinal axis defines a respective opposite equal angle α° and β°. The distance N is measured from the free downstream end of the linear-walled frustoconical end section and the end of the linear walls defining the gulley section.

It may be see that the LCR distribution modelled in FIG. 11 was substantially uniform.

Various other modifications to the illustrated embodiment will be apparent to those skilled in the art and are intended to be within the scope of the present invention as defined by the appended claims.

The invention claimed is:

1. A flume for supplying vegetable pieces in a supply of liquid, the flume extending between a flume inlet and a flume outlet, the flume comprising:
   a gulley section having an upstream inlet end at the flume inlet and a downstream outlet end, the gulley section having opposed sidewalls and a gulley floor therebetween, and
   a spreader section having opposed first and second lateral walls and a spreader floor therebetween, the spreader section having an upstream end connected to the downstream outlet end of the gulley section, the spreader section progressively increasing in width between the opposed first and second lateral walls in a downstream direction from the upstream end to a downstream end of the spreader section, wherein the opposed first and second lateral walls are each outwardly inclined away from a central longitudinal axis of the flume by a respective angle $\alpha°$ for the first lateral wall and $\beta°$ for the second lateral wall, in respective opposite directions, which extends from the upstream end of the spreader section to the downstream end of the spreader section,
   wherein, at the downstream outlet end, the gulley section has a width of the gulley floor (W1), the spreader section between the upstream and downstream ends of the spreader section has a length (N), and a dimensionless ratio N/W1 is within a range of 6 to 13, and
   wherein a sum of $\alpha°$ and $\beta°$ is from 10 to 25°.

2. The flume according to claim 1, wherein angle $\alpha°$ and $\beta°$ are equal and the spreader section is symmetrical on opposite sides of the longitudinal axis.

3. The flume according to claim 1, wherein the opposed first and second lateral walls are linear and each first and second lateral wall diverges at a respective constant angle relative to the longitudinal axis.

4. The flume according to claim 1, wherein the opposed first and second lateral walls include a curved portion which connects to a respective sidewall of the gulley section, and the spreader section is trumpet-shaped in plan.

5. The flume according to claim 4, wherein (i) the respective opposed lateral walls each comprise an upstream continuously convexly curved transition section connected to a downstream linear section and the opposed lateral walls of the spreader section terminate in a linear-walled frustoconical end section; or (ii) the respective opposed lateral walls are each continuously convexly curved extending between the upstream and downstream ends of the spreader section; or (iii) the respective opposed lateral walls each have an inflected wall, and comprise an upstream continuously convexly curved transition section, an intermediate concavely curved intermediate section and a downstream section which is a convexly curved end section or a linear walled frustoconical end section.

6. The flume according to claim 1, wherein the downstream end of the spreader floor of the spreader section has a width (W2) which is a factor of from 2 to 8 greater than the width W1.

7. The flume according to claim 1, wherein the gulley section has a constant width of the gulley floor along the length thereof.

8. The flume according to claim 1, wherein the gulley section is downwardly inclined towards the spreader section at an angle to the horizontal of from 0.5 to 5 degrees.

9. The flume according to claim 1, wherein the spreader section is downwardly inclined towards the flume outlet at an angle to the horizontal of from 0.5 to 5 degrees.

10. The flume according to claim 1, wherein the spreader floor is free of any three-dimensional elements or three-dimensional surfaces extending upwardly therefrom.

11. The flume according to claim 1, wherein the opposed sidewalls of the gulley section and/or the opposed first and second lateral walls of the spreader section are inclined to the vertical, at an angle of up to 20°, in a direction upwardly and outwardly away from the longitudinal axis.

12. The flume according to claim 1, wherein the flume further comprises a discharge chute connected at an upstream end thereof to the downstream end of the spreader section, the discharge chute having opposed sidewalls and a discharge floor therebetween.

13. The flume according to claim 12, wherein the discharge chute is downwardly inclined at an angle to the horizontal which is greater than the angle to the horizontal of the spreader section, optionally wherein the discharge chute is downwardly inclined at an angle to the horizontal of from 2 to 10 degrees, or from 4 to 8 degrees, or about 5 degrees.

14. The flume according to claim 12, wherein the discharge floor is a planar surface and is free of any three-dimensional elements or three-dimensional surfaces extending upwardly therefrom.

15. A method of supplying vegetable pieces, the method comprising the steps of:
   (a) providing a flume according to claim 1; and
   (b) providing a supply of liquid containing the vegetable pieces into the gulley section of the flume thereby forming (i) a first flow of the vegetable pieces in the liquid from the upstream inlet end of the gulley section at the flume inlet to the downstream outlet end of the gulley section and thereafter (ii) a second flow, downstream of the first flow, of the vegetable pieces in the liquid from the downstream outlet end of the gulley section to the downstream end of the spreader section, wherein in the second flow, the vegetable pieces are spread across the width of the spreader section.

16. The method according to claim 15, wherein the vegetable pieces are potato slices for the manufacture of potato chips and the liquid is water.

17. The method according to claim 15, wherein in the gulley section the first flow has a velocity of from 0.6 to 1.4 meters/second, or from 0.6 to 1.0 meters/second.

18. The method according to claim 15, wherein at the downstream end of the spreader section the second flow has a velocity that is higher than the velocity of the first flow and is greater than 1.0 meters/second.

19. The method according to claim 15, wherein across a surface area of the spreader floor a minimum velocity of the second flow is at least 0.6 meters/second.

20. The method according to claim 15, wherein the vegetable pieces are supplied to a cooking apparatus and wherein in step (a) the flume outlet is mounted to an input end of a conveyer for supplying the vegetable pieces to a cooking apparatus; and the method further comprises the steps of:
   (c) discharging the vegetable pieces in the liquid onto the conveyor from the flume outlet; and
   (d) conveying the vegetable pieces on the conveyor to the cooking apparatus, wherein the conveyor is permeable to liquid and the liquid is at least partially drained from the vegetable pieces on the conveyor.

* * * * *